United States Patent [19]

Fukushima

[11] Patent Number: 4,751,993
[45] Date of Patent: Jun. 21, 1988

[54] FLYWHEEL ASSEMBLY

[75] Inventor: Hirotaka Fukushima, Hirakata, Japan

[73] Assignee: Kabushiki Kaisha Daikin Seisakusho, Osaka, Japan

[21] Appl. No.: 836,365

[22] Filed: Mar. 5, 1986

[30] Foreign Application Priority Data

Mar. 6, 1985 [JP] Japan ................................. 60-44298

[51] Int. Cl.⁴ ............................................. F16D 3/14
[52] U.S. Cl. ............................. 192/106.7; 192/106.2; 74/572; 74/574
[58] Field of Search ............... 192/106.1, 106.2, 70.16, 192/70.17, 70.18, 70.19, 70.27, 89 B, 30 V; 74/572, 574; 464/66, 67, 63

[56] References Cited

U.S. PATENT DOCUMENTS

| | | | |
|---|---|---|---|
| 1,862,991 | 6/1932 | Vargha | 192/106.1 |
| 2,982,150 | 5/1961 | Kolbe | 74/574 |
| 4,220,233 | 9/1980 | Nan et al. | 192/106.2 |
| 4,267,805 | 5/1981 | Schmuck | 74/572 X |
| 4,468,207 | 8/1984 | Yoshida | 192/106.2 X |
| 4,548,310 | 12/1985 | Maucher | 192/106.1 X |

*Primary Examiner*—William F. Pate, III
*Assistant Examiner*—Creighton Smith
*Attorney, Agent, or Firm*—Armstrong, Nikaido, Marmelstein & Kubovcik

[57] ABSTRACT

A flywheel assembly including a first flywheel fixed to a crank shaft of an engine and engaged and disengaged by a clutch disc, a second flywheel installed concentrically with the first flywheel and set to a specified mass, a damper mechanism resiliently connecting the both flywheels, and a friction damping mechanism which transmits an output from the second flywheel to a spline hub of the clutch disc only when said clutch disc engages with the first flywheel.

10 Claims, 6 Drawing Sheets

FLYWHEEL ASSEMBLY

BACKGROUND OF THE INVENTION

1. Industrial Use Field

This invention relates to a flywheel assembly which can absorb vibration of an entered power.

2. Prior Art and its Problem

Figure 3:
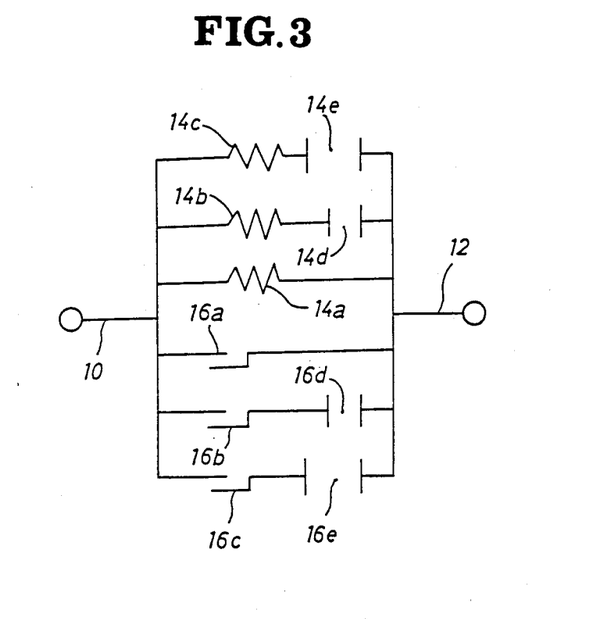
FIG. 3 is a schematic structural view showing a conventional embodiment.

In FIG. 3 which is a schematic structural view of a conventional clutch disc, 10 is a power entered side from an engine, and 12 is an output side from which the power is transmitted to a speed changer etc., for example. A first-stage torsion spring 14a, a second stage torsion spring 14b and a third-stage torsion spring 14c are interposed between the input side 10 and the output side 12, and specified torsional angular clearances 14d and 14e are provided for the second-stage torsion spring 14b and the third-stage torsion spring 14c. Further, a first-stage hysteresis torque generating mechanism 16a, a second-stage hysteresis torque generating mechanism 16b and a third-stage hysteresis torque generating mechanism 16c are interposed in the same manner as above, and clearances 16d and 16e are provided for the second-stage hysteresis torque generating mechanism 16b and the third-stage hysteresis torque generating mechanism 16c.

Figure 4:
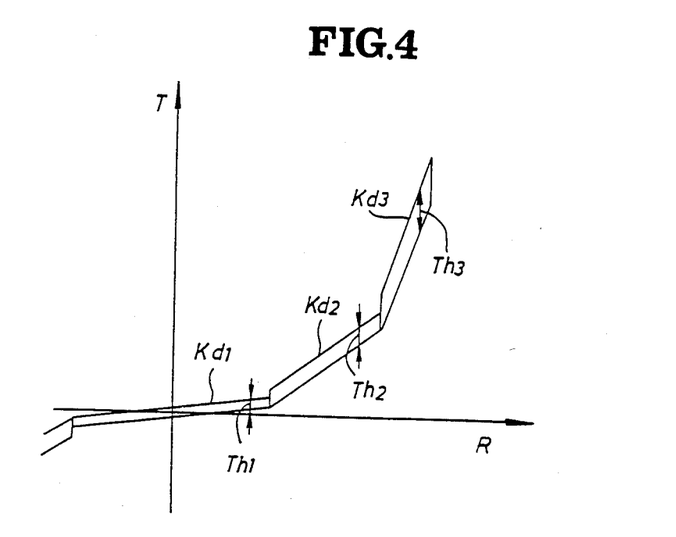
FIG. 4 is a graph showing a torsion characteristic of the conventional embodiment of FIG. 3.

In the above conventional embodiment, with an increase in a torsion angle as illustrated in FIG. 4 showing a transmitting torque T in relation to a torsion angle R, torsion characteristics change from a first-stage torsion characteristic kd1 and a first-stage hysteresis characteristic Th1 generated by the first-stage torsion spring 14a and the first-stage hysteresis torque generating mechanism 16a, to a third-stage torsion characteristic kd3 and a third-stage hysteresis characteristic Th3 generated by the third-stage torsion spring 14c and the third-stage hysteresis torque generating mechanism 16c. However, these characteristics include the following defects.

It is preferable to minimize the first-stage torsion characteristic kd1—the third-stage torsion characteristic kd3 as a countermeasure against tooth chattering sound emitted from a speed changer under its neutral state and tooth chattering sound generated from the speed changer and a differential mechanism during running. On the other hand, it is required to set the first-stage torsion characteristic kd1—the third-stage torsion characteristic kd3 to large values as a countermeasure against low frequency vibrations.

Accordingly, it becomes necessary to set the torque characteristic of FIG. 4 depending on a respective characteristic required by every vehicle. Moreover, in recent years a demand level for clutch to control abnormal sound and vibration becomes higher and higher, so that in some occasions it is required to simultaneously provide a characteristic, which can not be attained by a conventional construction, such that the conflicting countermeasures against abnormal sound and low frequency vibration must be taken at the same time as mentioned above.

Therefore, a technique for positively absorbing vibrations from engine in a flywheel has been developed.

Figure 5:
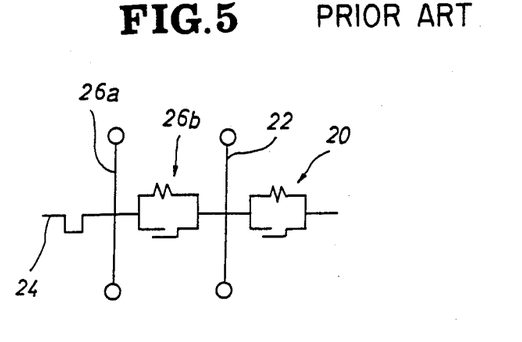
FIG. 5 and FIG. 6 are schematic structural views showing another prior arts respectively.
Figure 6:
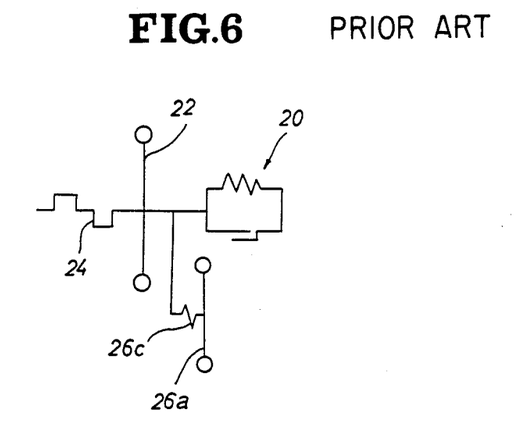

There are prior arts, in which an auxiliary flywheel 26a and a damper 26b are connected in series in between a conventional clutch disc 20, a flywheel 22 and a crank shaft 24 as shown in FIG. 5, and an auxiliary flywheel 26a is installed through a torsion spring 26c in parallel with the flywheel 22 as shown in FIG. 6.

However, since the above-mentioned prior arts have insufficient vibration absorbing abilities, it is desired to develope a flywheel assembly having a further efficient vibration absorbing ability.

OBJECT OF THE INVENTION

An object of the present invention is to provide a flywheel assembly which can efficiently absorb vibrations from an engine.

COMPOSITION OF THE INVENTION

(1) Technical measure

The present invention relates to a flywheel assembly including a first flywheel to a crank shaft of an engine and engaged and disengaged by a clutch disc, a second flywheel installed concentrically with the first flywheel and set to a specified mass, a damper mechanism resiliently connecting the both flywheels, and a friction damping mechanism which transmits an output from the second flywheel to a spline hub of the clutch disc only when said clutch disc engages with the first flywheel.

(2) Function

The damper mechanism and the second flywheel absorb a rotational fluctuation of the engine, and under a clutch engaged mode the friction damping mechanism makes the second flywheel connect to and interfere with the spline hub of the clutch disc to absorb a rotational fluctuation and a torque fluctuation at the spline hub.

EMBODIMENT

A clutch applied with the present invention will be described hereunder with reference to FIG. 1.

Figure 1:
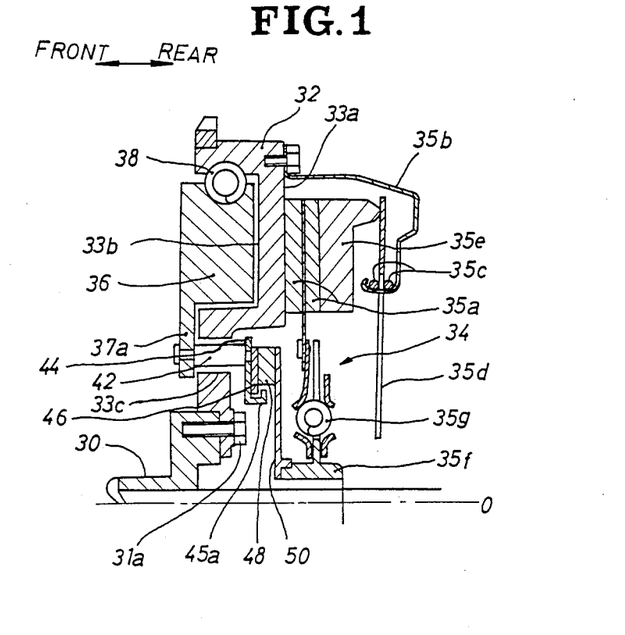
FIG. 1 is a vertical sectional partial view of a clutch applied with the present invention.

In FIG. 1, 30 is an engine crank shaft. A first flywheel 32 is fastened by a bolt 31a to a rear end of the crank shaft. A facing 35a of a clutch disc 34 is adapted to contact with an annular face 33a of the first flywheel 32. A clutch cover 35b is fixed to a rear end face of the first flywheel 32, and a pressure plate 35e is held to the clutch cover 35b through a wire ring 35c and a diaphragm spring 35d.

The first flywheel 32 is formed into an approximately disc-like shape, and an annular groove 33b is formed on a front face outer peripheral part of the first flywheel 32. A second flywheel 36 is installed in the annular groove 33b in such a manner as concentrical with and freely rotatable to the first flywheel 32.

The second flywheel 36 is formed into an approximately annular shape having a flange 37a in its inner peripheral part, and is set to a specified mass corresponding to an inertial mass of a transmission system such as a speed changer (not shown) coupled to a rear stage of the clutch.

A torsion spring 38 (damper mechanism) made of a compression coil spring is compressively installed between an outer peripheral part of the second flywheel 36 and an inner peripheral part of the first flywheel 32 to be adapted to resiliently couple the first flywheel 32 with the second flywheel 36.

Figure 1A:
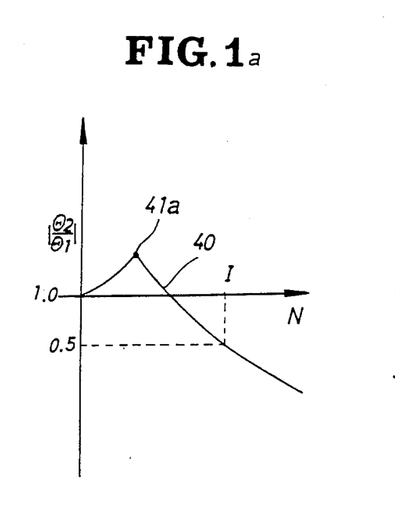
FIG. 1a is a graph showing a damping characteristic.

A spring constant of the torsion spring 38 is set to such a value that a resonance point 41a of a characteristic 40 representing a relation between a value of $|\theta2/\theta1|$ (absolute value) and an engine rotation speed N arises at a speed region of lower than an idling rotation speed I, wherein a rate of change in angular speed for the first flywheel 32 is designated as $\theta1$ and a rate of change in angular speed for a clutch disc spline hub 35f is designated as $\theta2$.

Accordingly, at a normal speed region higher than the idling speed I, the value of $|\theta2/\theta1|$ decreases with an increase in the rotation speed so that the rate of change in angular speed $\theta2$ for the clutch disc spline hub 35f, i.e. a rotational fluctuation of speed changer etc. which is a kind of vibration, is adapted to become small to such an extent of practically negligible.

One end of a pin 42 is secured by "crimp work" to three places, for example, of the flange 37a with equal spaces left therebetween in its circumferential direction. The pin 42 extends through a hole 33c of the first flywheel 32 toward the backward clutch disc 34 side, and a retainer plate 44 is secured to the other end of the pin 42 samely by the "crimp work".

The retainer plate 44 is formed into an approximately annular shape having a flange 45a on its inner peripheral edge, and retains a wave spring 46 by being fitted with an inner peripheral edge of the wave spring 46. An annular facing 48 is secured to an end face of the wave spring 46 facing to the clutch disc 34 side, and the retaining plate 44, the wave spring 46 and the facing 48 are adapted to rotate integrally together with the second flywheel 36. Incidentally, said hole 33c is formed into a circular-arc shape having its center on a rotation center 0 of the first flywheel 32 so as to permit the second flywheel 36 to rotate in relation to the first flywheel 32 within a specified rotation angle.

An inner peripheral part of a press-on plate 50 is secured to a part of the spline hub 35f for the clutch disc 34 facing to the first flywheel 32. The press-on plate 50 is formed into an approximately annular shape, and an outer peripheral part of the press-on plate 50 is adapted to be pressed on the facing 48, only when the clutch is engaged, by an axial slide of the clutch disc 34 accompanied by a clutch engaging/disengaging operation.

The pin 42, the retaining plate 44, the wave spring 46, the facing 48 and the press-on plate 50 compose a friction damping mechanism which couples the second flywheel 36 with the spline hub 35f only when the clutch disc 34 presses on the annular face 33a.

Figure 1B:
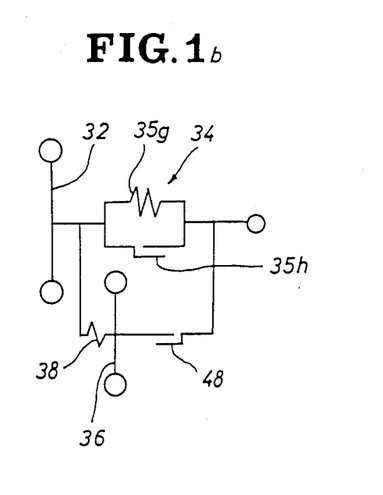
FIG. 1b is a schematic structural view schematizing the construction of FIG. 1.

As shown in FIG. 1b which schematically illustrates the above-mentioned clutch construction, the clutch disc 34 is disposed in parallel with the second flywheel 36 at a rear stage of the first flywheel 32. In the clutch disc 34, a torsion spring 35g is installed in parallel with a hysteresis torque generating mechanism 35h. In the second flywheel 36, a torsion spring 38 is installed in series with a facing for generating a hysteresis torque.

Function will be described hereunder. At the time of clutch engaging mode wherein the facing 35a is pressed by the pressure plate 35e against the annular face 33a of the first flywheel 32, a spring force of the diaphragm spring 35d causes the clutch disc 34 to slide on a spline shaft of a speed changer (not shown) toward the first flywheel 32 and causes the press-on plate 50 to press on the facing 48. In this instance, the wave spring 46 is deforemd by a pressure of the press-on plate 50 due to its own elasticity, so that the press-on plate 50 and the facing 48 are always pressed each other by a constant pressing force and a friction force generated between the facing 48 and the press-on plate 50 is always maintained at a constant value.

Under the above clutch engaging mode, the engine power entered in the first flywheel 32 is transmitted to the speed changer through two routes: i.e. a route through the clutch 34 to the speed changer and a route from the second flywheel 36 through the facing 48 and the press-on plate 50 to the speed changer.

Consequently, as for a torque (average torque+fluctuating torque) transmitted from the engine to the speed changer, its fluctuating torque is removed by the facing 48 and the second flywheel 36 which is resiliently supported by the torsion spring 38 so as to be freely floated, and only the average torque is transmitted through the clutch disc 34 to the speed changer. Therefore, the engine rotational fluctuation and the torque fluctuation can be removed substantially completely.

EFFECT OF THE INVENTION

As described above, the flywheel assembly of the present invention includes the first flywheel fixed to the crank shaft of the engine and engaged and disengaged by the clutch disc, the second flywheel provided concentrically with the first flywheel and set to the specified mass, the damper mechanism resiliently connecting the both flywheels, and the friction damping mechanism which transmits the output from the second flywheel to the spline hub of the clutch disc only when said clutch disc engages with the first flywheel. Therefore, the vibration generated by the spline hub 35f of the clutch disc 34 interposing the press-on plate 50 etc. can be damped and the engine rotational fluctuation and the torque fluctuation can be removed by the spline hub 35f substantially completely through the removal of the rotational fluctuation of the first flywheel 32 by using the torsion spring 38, the pin 42 and the facing 48. Further, the second flywheel 36 has a comparatively large mass which can therefore be set to an optimum value for decreasing levels of abnormal sound and vibration corresponding to the inertial mass of the speed changer.

Figure 2:
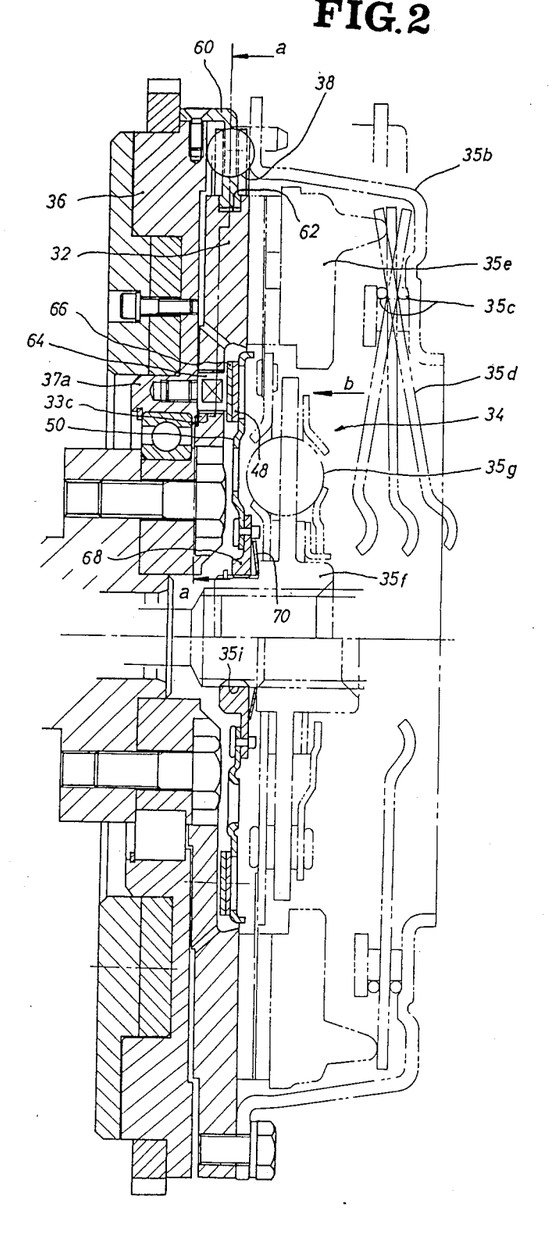
FIG. 2 is a vertical sectional view showing another embodiment.

ANOTHER EMBODIMENT (1) When emboding the present invention, not only the construction as shown in FIG. 1 but that shown in FIG. 2 may be used. Incidentally, in FIG. 2, a part attached with the same symbol as FIG. 1 shows the same as or equivalent to a corresponding part of FIG. 1.

Figure 2A:
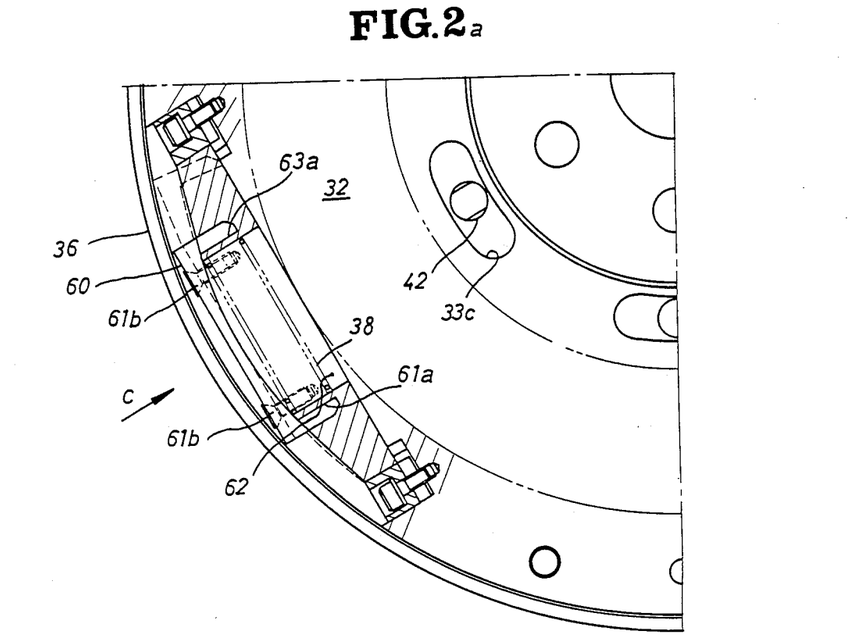
FIG. 2a is a partially sectional view taken on a line a—a of FIG. 2.
Figure 2B:
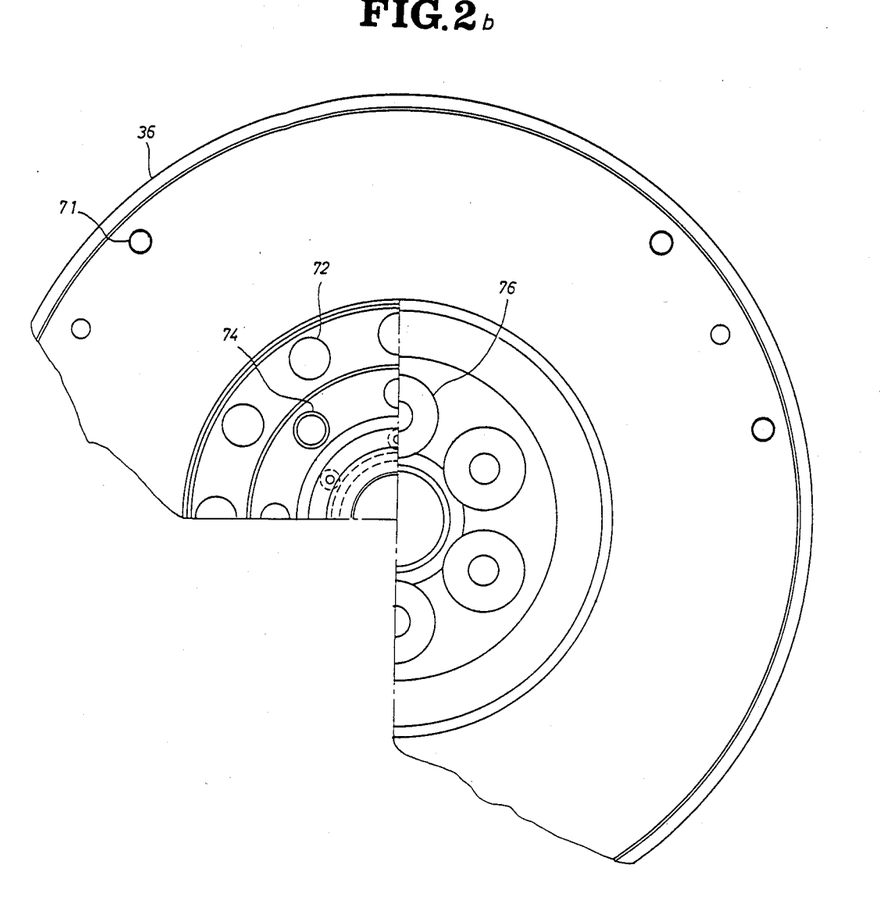
FIG. 2b is a partial view viewing in a direction of arrow b of FIG. 2.
Figure 2C:
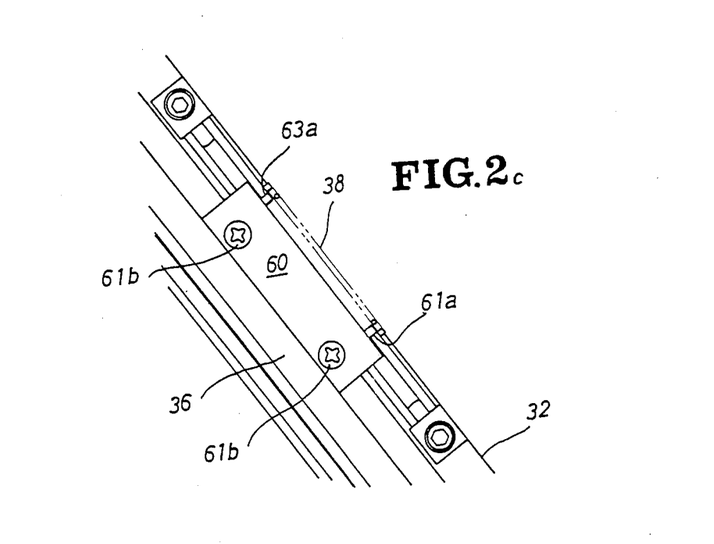
FIG. 2c is a view viewing in a direction of arrow c of FIG. 2b.

In FIG. 2, the torsion spring 38 (compression coil spring) is installed between a bracket 60 of the second flywheel 36 and a recession 62 of the first flywheel 32. The recession 62 is formed on an outer peripheral part of the first flywheel 32 at six places, for example, with equal spaces left therebetween as illustrated in FIG. 2a, FIG. 2b and FIG. 2c. The recession 62 is provided with a spring holder 63a formed integrally therewith and extending radially outwardly.

On the other hand, the bracket 60 covering an opening edge of the recession 62 is provided with a spring holder 61a pressed on toward a radial inside. The torsion spring 38 is compressively installed between the spring holder 63a and the spring holder 61a. The bracket 60 is fastened by a screw 61b to an outer peripheral edge of the second flywheel 36.

As shown in FIG. 2, a bolt 64 turned in and fixed to the flange 37a of the second flywheel 36 extends through the hole 33c to the clutch disc 34 side, and a press-on plate 66 is secured to the clutch disc 34 side of the bolt 64.

The facing 48 which faces on the press-on plate 66 is secured to the press-on plate 50 installed between the first flywheel 32 and the clutch disc 34, and an inner peripheral part of the press-on plate 50 is fixed to a sub-spline hub 68. The sub-spline hub 68 fits in a spline external tooth 35i of the spline hub 35f so as to be freely slidable in its axial direction. A cone spring 70 is compressively installed between the sub-spline hub 68 and the spline hub 35f, and the facing 48 is adapted to be pressed on the press-on plate 66 by means of a spring force of the cone spring 70.

The bolt 64, the press-on plate 66, the facing 48, the press-on plate 50, the sub-spline hub 68 and the cone spring 70 etc. together compose the friction damping mechanism.

Incidentally, FIG. 2b is a view showing the press-on plate 50 and the sub-spline hub 68 viewed from their backside. In FIG. 2b, 71 is a bolt hole for fastening a clutch cover, 72 is a false hole for lessening an inertial mass, 74 is a cylindrical wall for improving a rigidity, and 76 is a counterbore and bolt hole for fastening the first flywheel.

(2) Further, the friction damping mechanism is not limited to the above two embodiments but may have a construction which can transmit the output from the second flywheel to the spline hub of the clutch disc only when said clutch disc engages with the first flywheel.

Incidentally, the friction described in the present specification includes all frictional phenomena such as a dry friction, a viscous friction etc.

What is claimed is

1. A flywheel assembly including a first flywheel fixed to a crank shaft of an engine and engaged and disengaged by a clutch disc, a second flywheel installed concentrically with the first flywheel and set to a specified mass, a damper mechanism resiliently connecting the both flywheels, and a friction damping mechanism which transmits an output from the second flywheel to a spline hub of the clutch disc only when said clutch disc engages with the first flywheel; characterized by that the mass of the second flywheel is set to a value corresponding to an inertial mass of a transmission system coupled to a rear stage of the clutch, a flange having a comparatively thin wall thickness is formed on a radially inner peripheral part of the second flywheel, a pin forming a part of the friction damping mechanism is fixed to the flange, a hole for passing the pin forming a part of the friction damping mechanism is made on a radially inner peripheral part of the first flywheel, said hole being formed into a circular-arc shape having its center on a rotation center of the first flywheel so as to permit the second flywheel to rotate in relation to the first flywheel within a specified rotation angle, said damper mechanism comprising a torsion spring which is compressively installed between an outer peripheral part of the second flywheel and the inner peripheral part of the first flywheel to resiliently couple the both flywheels, a spring constant of the torsion spring is set to such a value that vibrations transmitted from the first flywheel to the spline hub of the clutch disc do not produce resonances in a rotation speed region higher than an engine idling rotation speed, said torsion spring being disposed in a recession formed on an outer peripheral edge of the first flywheel, a spring holder fixed to the first flywheel and holding both ends of the torsion spring is installed in the recession, at the same time a second flywheel side spring holder holding the both ends of the the torsion spring is installed in the recession, the damper mechanism comprising a pin passing through the radially inner peripheral part of the first flywheel and fixed to an inner peripheral flange of the second flywheel, an approximately annular holder plate provided at a clutch disc side end of the pin, a spring member fitted in and fixed to an inner peripheral flange of the holder plate, an annular facing fixed to a clutch disc side end face of the spring member, and an approximately annular press-on plate which is fixed to the spline hub of the clutch disc so as to be pressed on said annular facing only when the clutch is engaged.

2. A flywheel assembly comprising:
a first flywheel means fixed on a crankshaft of an engine;
a clutch means;
means for engaging and disengaging the first flywheel means and the clutch means to thereby transmit torque from the crankshaft to the clutch means;
a second flywheel means concentrically and rotatably positioned within the first flywheel means;
a first damper means for resiliently connecting the first and second flywheel means; and
a second damper means for slidably connecting the second flywheel means with the clutch means, wherein the second damper means transmits an output from the second flywheel means to the clutch means only when the clutch means is engaged with the first flywheel.

3. A flywheel assembly according to claim 2, in which a mass of the second flywheel means is set to a value corresponding to an inertial mass of a transmission system coupled to the clutch means.

4. A flywheel assembly according to claim 2, in which a flange having a comparatively thin wall is formed at the inner center of the second flywheel means, and a pin is fixed on the flange of the second flywheel means to connect the same to the second damper means.

5. A flywheel assembly according to claim 2, in which the second flywheel means is provided with a pin and the first flywheel means is provided with an arcuate slit through which the pin passes, the arcuate slit being concentric with the first flywheel means so that the second flywheel means rotates in relation to the first flywheel means with a specified rotation angle.

6. A flywheel assembly according to claim 2, in which the first damper mechanism comprises a torsion spring which is installed in a compressed condition between an outer peripheral part of the second flywheel means and the inner periphery of a part of the first flywheel means extending over the outer peripheral part of the second flywheel means to resiliently couple both flywheel means.

7. A flywheel assembly according to claim 6, in which a spring constant of the torsion spring is set to a value such that vibrations transmitted form the first flywheel means to a spline hub fixed on the clutch means do not produce resonances at a rotation speed region higher than an engine idling rotation speed.

8. A flywheel assembly according to claim 2, in which a torsion spring is installed between a bracket of the first flywheel means and a bracket of the second flywheel means.

9. A flywheel assembly according to claim 2, in which the second damper means comprises a pin passing through an arcuate slit provided in the first flywheel and fixed to an inner peripheral flange of the second flywheel means, an approximately annular holder plate provided at a free end of the pin, a spring member fitted in and fixed to an inner peripheral flange of the holder plate, an annular facing fixed on the spring member, and an approximately annular press-on plate fixed to the clutch means, whereby the press-on plate is to be pressed on said annular facing only when the clutch is engaged.

10. A flywheel assembly according to claim 2, in which a first damper means comprises a bolt passing through the first flywheel means and fastened to an inner peripheral flange of the second flywheel means, an approximately annular holder plate provided at a free end of the bolt, an annular facing fixed on the holder plate, an approximately annular press-on plate slidably installed in the clutch means, whereby the annular press-on plate is to be pressed on said annular facing only when the clutch is engaged and a spring member is pressing the press-on plate against said annular facing.

* * * * *